(12) United States Patent
Vinches et al.

(10) Patent No.: US 12,397,919 B2
(45) Date of Patent: Aug. 26, 2025

(54) ASSEMBLY FOR FIXING BEAMS, INCLUDING A SUPPORT PLATE AND TWO FIXINGS ON RESPECTIVE OPPOSITE SIDES OF THE SUPPORT PLATE

(71) Applicant: Airbus Operations SAS, Toulouse (FR)

(72) Inventors: Frédéric Vinches, Toulouse (FR); Kotaro Fukasaku, Toulouse (FR); Rémi Amargier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/637,748

(22) Filed: Apr. 17, 2024

(65) Prior Publication Data

US 2024/0351696 A1 Oct. 24, 2024

(30) Foreign Application Priority Data

Apr. 21, 2023 (FR) .................................. 2304043

(51) Int. Cl.
*B64D 29/02* (2006.01)
*B64D 27/40* (2024.01)

(52) U.S. Cl.
CPC ................................ *B64D 27/402* (2024.01)

(58) Field of Classification Search
CPC ...... B64D 27/402; B64D 27/40; B64D 27/12; B64D 27/06; F16B 9/056; F16B 7/185
See application file for complete search history.

(56) References Cited

U.S. PATENT DOCUMENTS

| 5,094,563 A * | 3/1992 | Carletti | F16B 9/056 |
| | | | 403/194 |
| 2005/0239318 A1* | 10/2005 | Newton, Jr. | H01R 13/7197 |
| | | | 439/383 |
| 2016/0280381 A1 | 9/2016 | Zameroski et al. | |
| 2019/0352905 A1 | 11/2019 | Desheng | |
| 2023/0003243 A1 | 1/2023 | Del Rio et al. | |
| 2024/0011539 A1* | 1/2024 | Hyodo | F16F 15/08 |

FOREIGN PATENT DOCUMENTS

FR    2993535 A1    1/2014

OTHER PUBLICATIONS

French Search Report for corresponding French Patent Application No. 2304043 dated Oct. 6, 2023.

* cited by examiner

*Primary Examiner* — Amy J. Sterling
(74) *Attorney, Agent, or Firm* — Greer, Burns & Crain, Ltd.

(57) ABSTRACT

An assembly including a support plate through which passes an opening with two faces parallel to a bearing plane, a first fixing fixed against the first face, first sleeves receiving beams, and a stud with a hole having an axis, a second fixing against the second face, second sleeves receiving beams, a housing for the stud and a clamping screw screwed into the hole, with the axis at an angle (α) to the bearing plane between 10° and 80° inclusive. The assembly forms a chassis which may be fixed to a propulsion assembly and a wing of an aircraft.

8 Claims, 4 Drawing Sheets

ASSEMBLY FOR FIXING BEAMS, INCLUDING A SUPPORT PLATE AND TWO FIXINGS ON RESPECTIVE OPPOSITE SIDES OF THE SUPPORT PLATE

CROSS-REFERENCES TO RELATED APPLICATIONS

This application claims the benefit of French Patent Application Number 2304043 filed on Apr. 21, 2023, the entire disclosure of which is incorporated herein by way of reference.

FIELD OF THE INVENTION

The present invention concerns an assembly for fixing beams to a support plate, including the support plate and two fixings fixed on respective opposite sides of the support plate and in which each fixing includes at least one sleeve for a beam. The present invention also concerns a chassis for a propulsion assembly of an aircraft as well as an aircraft including a propulsion assembly including such a chassis.

BACKGROUND OF THE INVENTION

An aircraft classically includes at least one propulsion assembly comprising an engine fastened to a chassis, more commonly referred to as a pylon, fixed to a structure of a wing of the aircraft. Such a chassis takes for example the form of a cage one embodiment of which is represented in FIG. 5. The chassis 500 includes a plurality of formers or ribs 502, here five of them, disposed one after the other along a longitudinal direction of the aircraft and, between two successive formers 502, beams or longerons 504 fixed by their ends to the two successive formers 502.

The beams 504 are fixed to each former 502 by fixings fixed to the former 502 one embodiment of which is represented in FIG. 6. FIG. 6 shows a former 502 and two beams 504 fixed on respective opposite sides of the former 502 at the level of the same fixing point by means of a first fixing 602a and a second fixing 602b. The former 502 has a first surface 502a inscribed in a first plane and a second surface 502b inscribed in a second plane parallel to the first plane.

The first fixing 602a has a first base 604a that is fixed to the former 502 by a plurality of fixing means 606a such as bolts. The first base 604a bears against the first surface 502a of the former 502. Opposite the first surface 502a the first fixing 602a has two sleeves 608a fastened to the first base 604a, each receiving inside it an end of a beam 504.

The second fixing 602b has a second base 604b that bears against the second surface 502b of the former 502 opposite the first surface 502a. The second fixing 602b is fixed to the first fixing 602a by a screw 610 with a head and a threaded shank, the threaded shank passing through the second fixing 602b and the former 502, to be screwed into a threaded hole of the first fixing 602a, and the head coming to bear against a part of the second fixing 602b so as to sandwich the former 502 between the first fixing 602a and the second fixing 602b. Opposite the second surface 502b the second fixing 602b includes two sleeves 608b fastened to the second base 604b and each receiving inside it one end of a beam 504.

The first fixing 602a also includes a centering stud 612 that fits in a hole of the second fixing 602b provided for this purpose.

Even if such an arrangement proves satisfactory, the design is such that the screw 610 must be perpendicular to the former 502 and, because of the overall size, all the beams 504 are at an angle to the former 502 and it is not possible to have a beam perpendicular to said former 502.

It is therefore desirable to find an arrangement that frees up the position of the beams and allows for example a position of the beam perpendicular to the former.

SUMMARY OF THE INVENTION

One object of the present invention is to propose an assembly for fixing beams in which there is greater freedom for orienting the beams.

To this end there is proposed an assembly for fixing beams, including:
  a support plate through which an opening passes and having a first face and a second face opposite the first face, the two faces being parallel to a bearing plane,
  a first fixing including a first base fixed against the first face by fixing means, on the side opposite the first face, at least one first sleeve intended to receive inside it one end of a beam, and a stud extending through said opening and including a hole with an axis,
  a second fixing including a second base bearing against the second face and, on the side opposite the second face, at least one second sleeve fastened to the second base and intended to receive inside it one end of a beam, and a housing in which said stud is housed and which includes a clamping wall through which passes a hole facing said hole, and
  a clamping screw screwed into the hole and sandwiching the clamping wall, the axis being at an angle to the bearing plane between 10° and 80° inclusive and preferably between 30° and 60° inclusive.

With such an arrangement the clamping screw is obliquely positioned relative to the bearing plane which, among other things, allows the placement of beams perpendicular to the bearing plane.

The hole is advantageously coaxial with one of the sleeves of the first fixing.

The head of the clamping screw is advantageously housed in a bushing of the second fixing one of the cylindrical surfaces of which carries a first thread and the assembly advantageously includes an additional beam one end of which carries a second thread complementary to the first thread.

The stud advantageously has an exterior surface that fits inside an interior surface of the housing and in that the exterior surface and the interior surface are parallel to the axis of the hole.

The stud advantageously has an exterior surface that fits inside an interior surface of the housing and the exterior surface and the interior surface are both advantageously perpendicular to the bearing plane.

The invention also proposes a chassis for fixing a propulsion assembly to a wing of an aircraft, said chassis including a plurality of formers and a plurality of beams with the beams fixed to the formers by means of assemblies according to any one of the preceding variants, each former constituting a support plate and each sleeve receiving inside it one end of a beam.

The invention also proposes aircraft including a chassis according to the preceding variant, a propulsion assembly and a wing, with the propulsion assembly fixed to the chassis and the chassis fixed to the wing.

BRIEF DESCRIPTION OF THE DRAWINGS

The features of the invention mentioned hereinabove and others will become more clearly apparent on reading the following description of one embodiment, said description being given with reference to the appended drawings, in which.

DETAILED DESCRIPTION OF THE PREFERRED EMBODIMENTS

Figure 1:
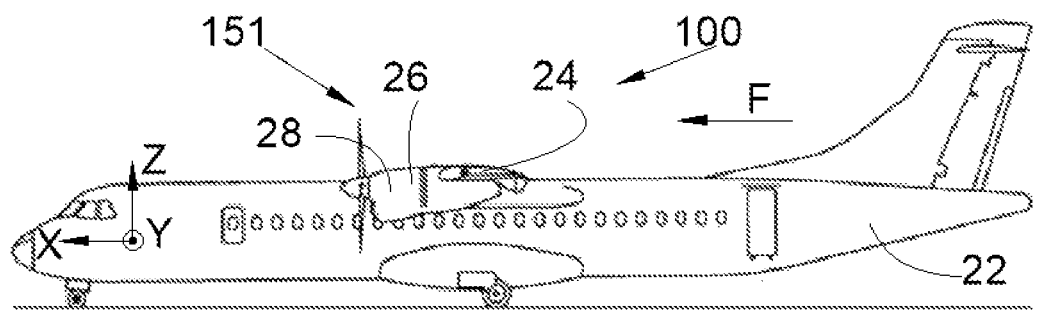
FIG. 1 is a side view of an aircraft in accordance with the invention including a propulsion assembly.

In the following description terms relating to a position refer to an aircraft in the attitude of forward movement, that is to say as represented in FIG. 1, where the arrow F shows the direction of forward movement of the aircraft.

In the following description, and by convention, X denotes the longitudinal direction that corresponds to the axis of the aircraft oriented positively toward the front in the direction of forward movement of the aircraft, Y denotes the transverse direction that is horizontal when the aircraft is on the ground, and Z denotes the vertical direction or vertical height when the aircraft is on the ground, the three directions X, Y and Z being mutually orthogonal.

FIG. 1 shows an aircraft 100 that includes a fuselage 22 to each side of which a wing 24 is fixed. Under each wing 24 there is fixed at least one propulsion assembly 151 that includes a nacelle 26 including fairings 28 forming an aerodynamic exterior surface. The propulsion assembly 151 also includes an engine that is housed in the nacelle 26 and which here takes the form of a propeller engine, but which may be of some other type.

Figure 5:
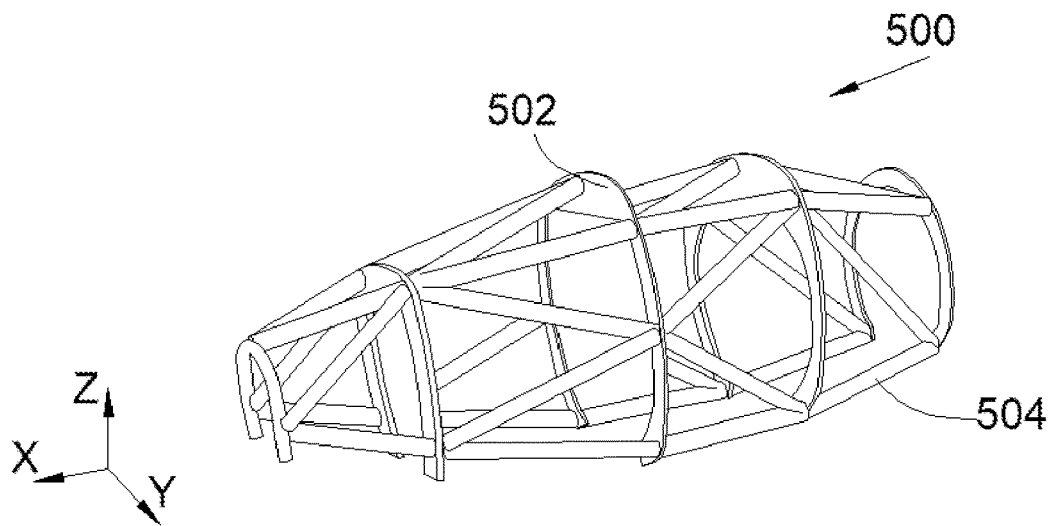
FIG. 5 is a perspective view of a chassis for an aircraft engine.
Figure 6:
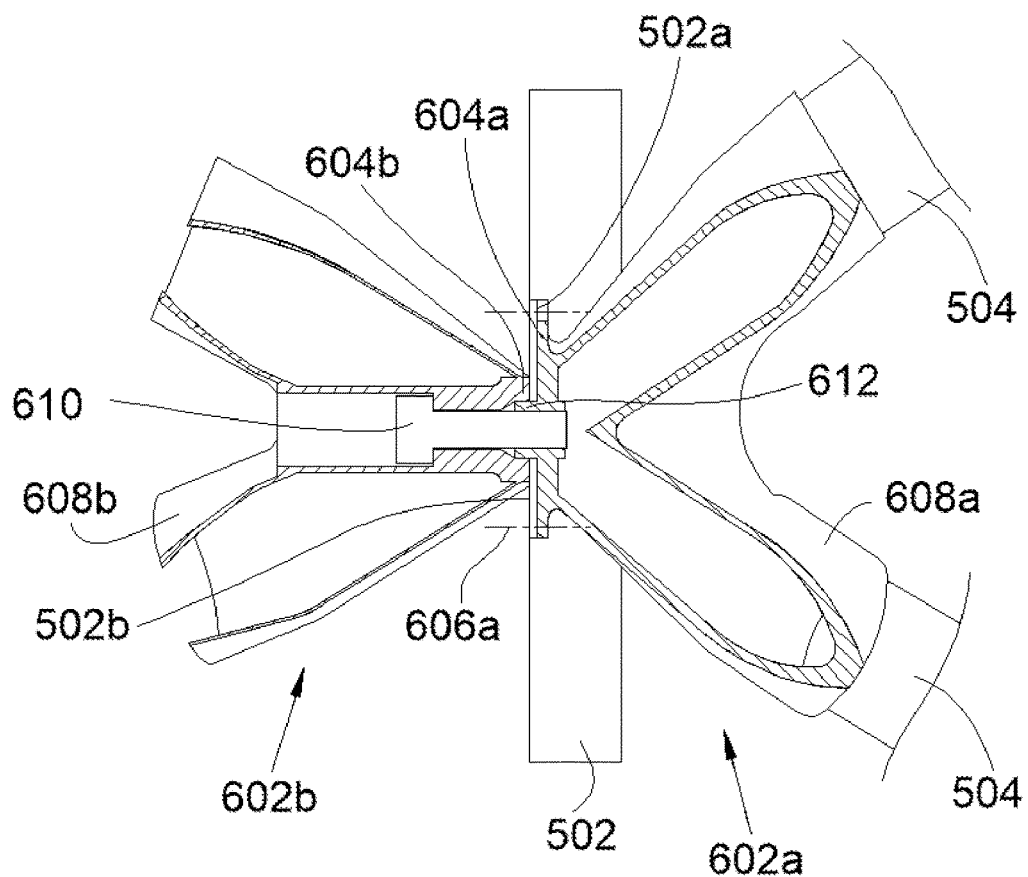
FIG. 6 is a side view of a prior art assembly.

The aircraft 100 also includes a chassis (also known as a pylon) such as that represented in FIG. 5. As already described hereinabove the chassis 500 includes structural elements interconnected to form a cage and here the chassis 500 includes a plurality of formers 502 disposed one after the other parallel to the longitudinal direction X and between two successive formers 502, and beams 504 fixed by their ends to the two successive formers 502. Of course, the chassis 500, the formers 502 and the beams 504 can take other forms. Such a chassis 500 constitutes a pylon for attaching the propulsion assembly 151 under the wing 24 with the propulsion assembly 151 fixed to the chassis 500 and the chassis 500 fixed to the wing 24.

Figure 2:
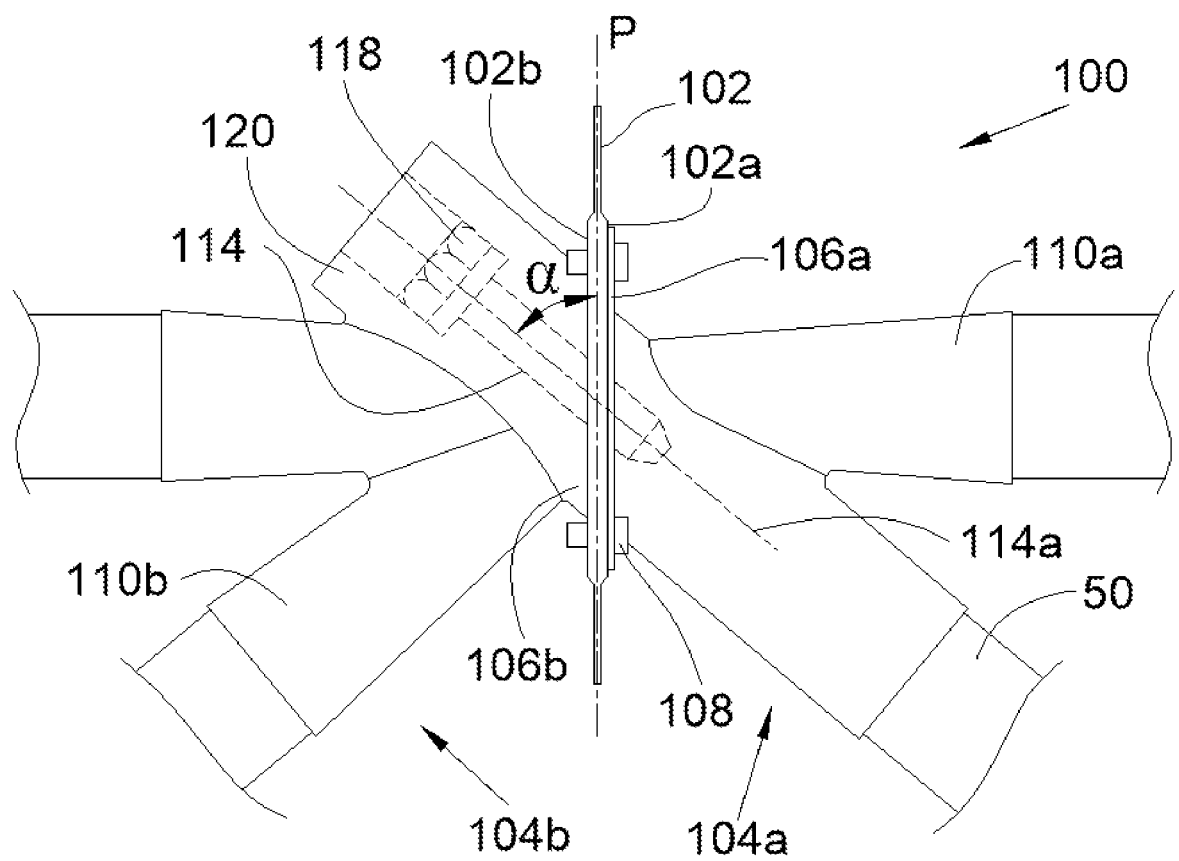
FIG. 2 is a side view of an assembly in accordance with a first embodiment of the invention.
Figure 3:
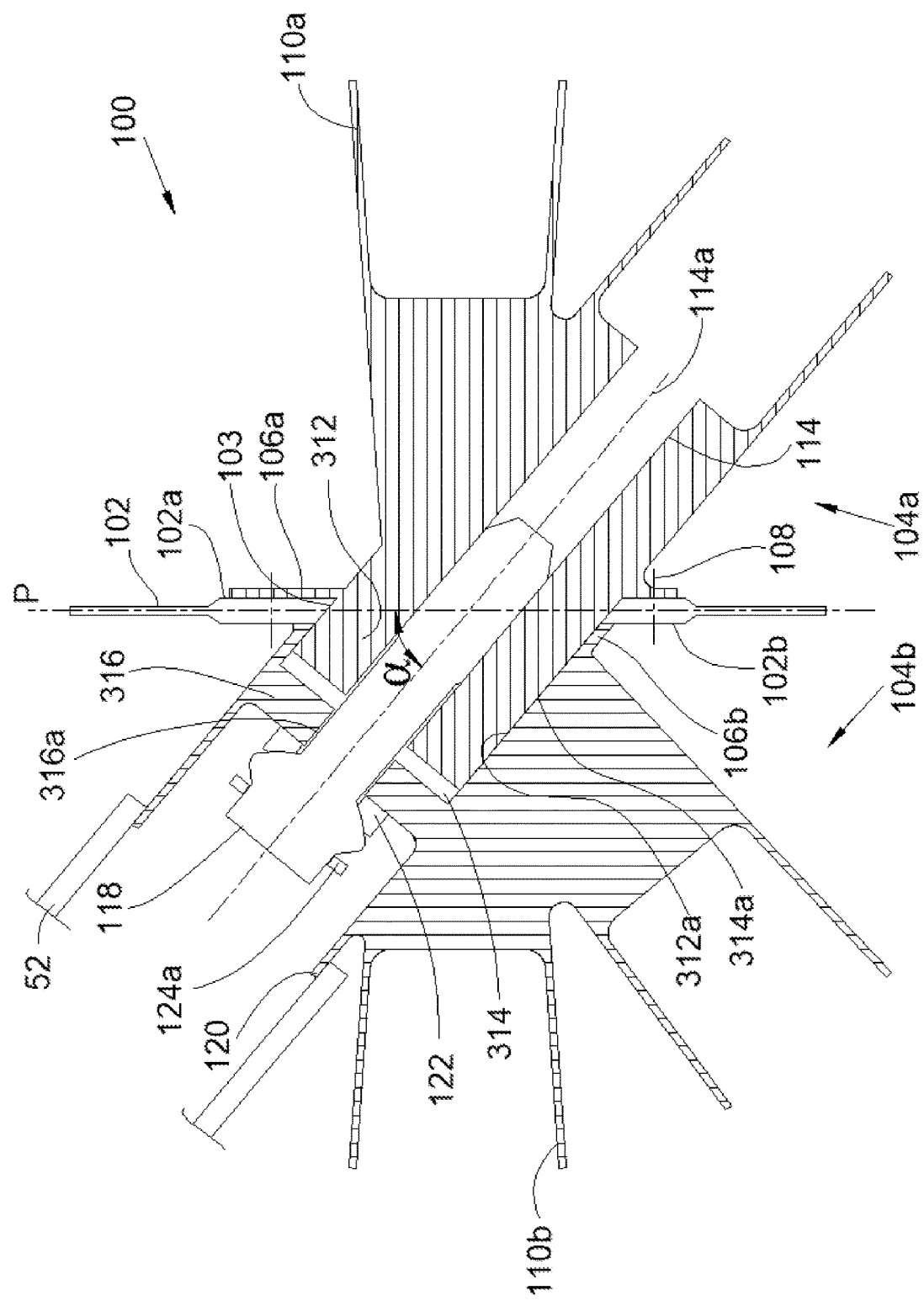
FIG. 3 is a view in section of the assembly from FIG. 2.
Figure 4:
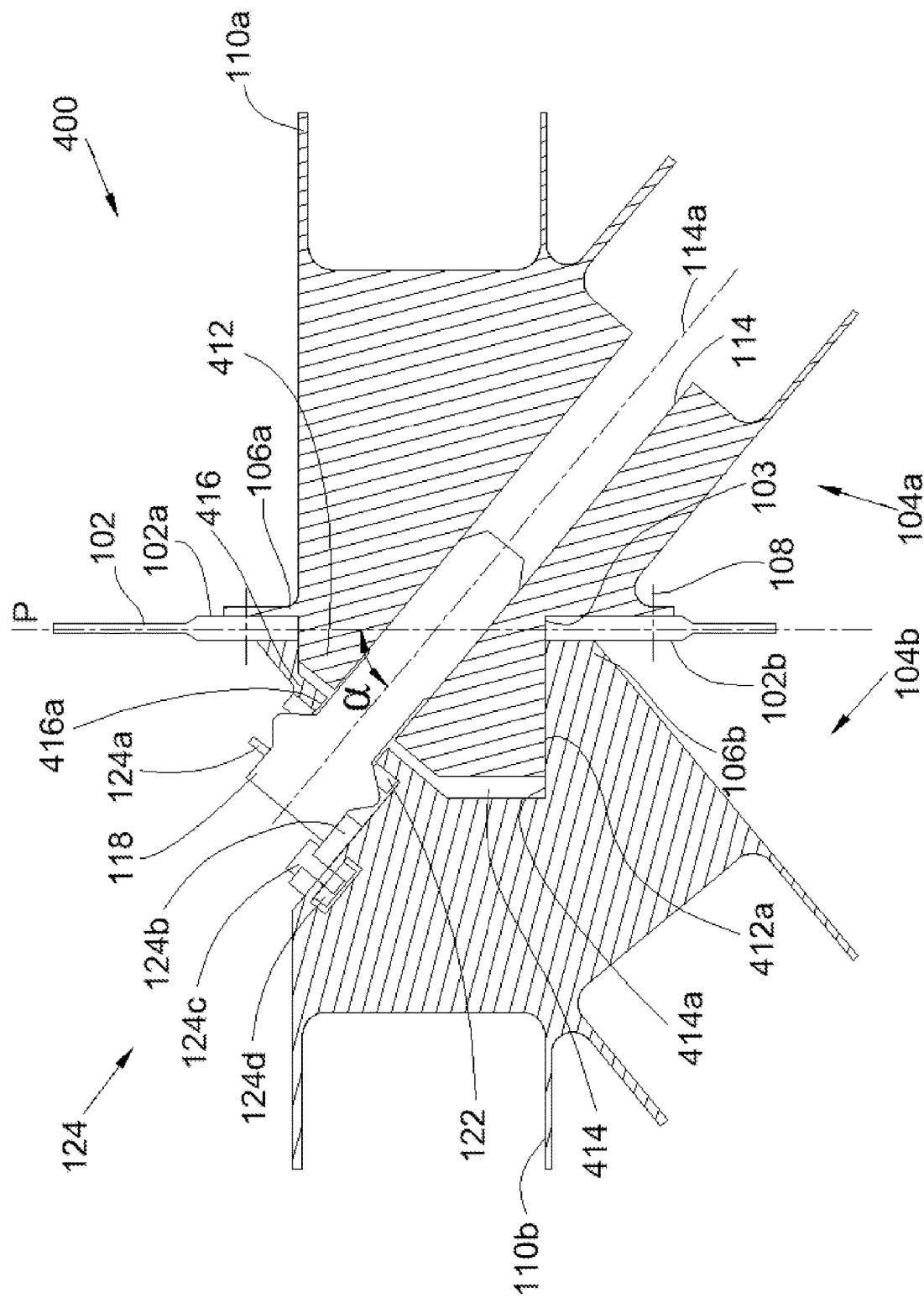
FIG. 4 is a view in section of an assembly in accordance with a second embodiment of the invention.

FIG. 2 shows the junction between a support plate 102 and beams 50 in the context of an assembly 100 in accordance with a first embodiment of the invention. FIG. 3 shows this assembly 100 in accordance with the first embodiment of the invention and FIG. 4 shows an assembly 400 in accordance with a second embodiment of the invention.

The assembly 100, 400 is more specifically described in the case of a chassis for fixing an aircraft engine but may be used in other fields when the beams thereof must be fixed to a support plate in a globally perpendicular manner, for example. Accordingly, the support plate 102 may be a former or another plane element.

The assembly 100, 400 is therefore intended for fixing beams 50 which here are four in number although depending on the overall size, and in particular the diameters of the beams 50, it is possible to have more or fewer, that is to say at least one.

The assembly 100, 400 thus includes the support plate 102 through which an opening 103 passes and the support plate 102 has two parallel faces that are parallel to a bearing plane P, the support plate 102 having a first face 102a and a second face 102b opposite the first face 102a.

The assembly 100, 400 also includes a first fixing 104a that comes to lie against the first face 102a and a second fixing 104b that comes to lie against the second face 102b.

The first fixing 104a has a first base 106a that comes to bear against the first face 102a to which it is fixed directly with the aid of fixing means 108 such as bolts that pass through the support plate 102 and the first base 106a.

When the first fixing 104a is in place against the first face 102a the first fixing 104a has on the side opposite the first face 102a at least one first sleeve 110a, here two of them, and each first sleeve 110a receives inside it one end of a beam 50, preferably with a force-fit and/or by welding. Each first sleeve 110a is fastened to the first base 106a.

In the embodiment of the invention shown in FIGS. 2 to 4 one of the beams 50 is perpendicular to the support plate 102, that is to say to the bearing plane P, but other orientations remain possible.

The first fixing 104a also includes a stud 312, 412 that extends through the opening 103 in the support plate 102 so as to be located on the other side of the support plate 102 relative to the first base 106a. The stud 312, 412 is also fastened to the first base 106a.

The stud 312, 412 includes a hole 114 with an axis 114a. Here the hole 114 is a through-hole but it could be a blind hole. The hole 114 opens at least on the side opposite the first base 106a, that is to say on the side of the second fixing 104b.

The second fixing 104b has a second base 106b that comes to bear against the second face 102b.

When the second fixing 104b is in place against the second face 102b the second fixing 104b has on the side opposite the second face 102b at least one second sleeve 110b, here also two of them, and each second sleeve 110b receives inside it one end of a beam 50, preferably with a force-fit and/or by welding. Each second sleeve 110b is fastened to the second base 106b.

In the same way as for the first fixing 104a, in the embodiment of the invention shown in FIGS. 2 to 4 one of the beams 50 is perpendicular to the support plate 102, that is to say to the bearing plane P, but other orientations remain possible.

The second fixing 104b also includes a hollow housing 314, 414 inside the second fixing 104b and in which the stud 312, 412 of the first fixing 104a is housed.

The housing 314, 414 includes a clamping wall 316, 416 that has through it a hole 316a, 416a facing, that is to say aligned with, the hole 114 of the stud 312, 412. The clamping wall 316, 416 then faces the hole 114 in the stud 312, 412 and is preferably perpendicular to the axis 114a of the hole 114.

The assembly 100 also includes a clamping screw 118 that has a head and a threaded shank, with the threaded shank screwed into the hole 114, which is threaded for this purpose, causing the head to bear against the clamping wall 316, 416, which is therefore sandwiched between the head of the clamping screw 118 and the stud 312, 412. The threaded shank of the clamping screw 118 is therefore introduced into the hole 316a, 416a and screwed into the hole 114 of the stud 312, 412.

The second fixing 104b is therefore not fixed directly to the support plate 102 but clamped by means of the first fixing 104a.

The axis 114a of the hole 114 is at an angle α to the bearing plane P between 10° and 80° inclusive and preferably between 30° and 60° inclusive.

Such an arrangement makes it possible to free up the space that perpendicularly faces the support plate 102, to place therein sleeves 110a-b which can therefore be perpendicular to the support plate 102.

In the case of a chassis 500 for an engine for an aircraft 100 and in the situation where a beam 50 on each side of the support plate 102 is perpendicular to the support plate 102, tension and shear forces that are transmitted through the chassis 500 are transferred across the clamping screw 118 and the shoulder of the first fixing 104a.

In the embodiments from FIGS. 3 and 4 the hole 114 is coaxial with one of the sleeves 110a of the first fixing 104a, which facilitates production of said hole 114.

In the first embodiment of the invention the head of the clamping screw 118 is housed in a bushing 120 of the second fixing 104b that here is cylindrical. Although this is not the case in the second embodiment of the invention, a bushing of this kind may equally be fitted. Here, the bushing 120 is coaxial with the axis 114a of the hole 114.

One of the cylindrical surfaces of the bushing 120 carries a first thread for screwing in an additional beam 52. To this end, one end of the additional beam 52 carries a second thread complementary to the first thread in order for them to cooperate.

In the embodiment of the invention shown in FIG. 3 the exterior surface of the bushing 120 is externally threaded and the additional beam 52 is internally threaded.

The stud 312, 412 has a preferably cylindrical exterior surface 312a, 412a that fits inside an interior surface 314a, 414a of the housing 314, 414 to guide movement in translation of the two fixings 104a-b relative to one another.

In the first embodiment of the invention the stud 312 has an exterior surface 312a and the housing 314 has an interior surface 314a that are both parallel to the axis 114a of the hole 114 and are therefore at the same angle α to the bearing plane P. Each of the exterior surface 312a and the interior surface 314a preferably takes the form of a cylindrical surface coaxial with the axis 114a of the hole 114.

In the second embodiment of the invention the stud 412 has an exterior surface 412a and the housing 414 has an interior surface 414a that are both perpendicular to the bearing plane P. In the case of a chassis 500 for an engine of an aircraft 100 this enables transfer of shear forces exclusively into the support plate 102. Each of the exterior surface 412a and the interior surface 414a preferably takes the form of a cylindrical surface perpendicular to the bearing plane P.

In the embodiments of the invention shown in FIGS. 3 and 4 the clamping screw 118 is tightened against the clamping wall 316, 416 via a washer 122.

In the second embodiment of the invention the head of the clamping screw 118 is prevented from rotating by immobilizing means 124. Such immobilizing means 124 can also be fitted in the first embodiment of the invention.

Here the immobilizing means 124 comprise a hexagonal ring 124a that is threaded around the hexagonal head of the clamping screw 118 and includes an extension 124 that is pierced and receives an immobilizing screw 124c that is screwed into a nut 124d immobilized in the second fixing 104b.

The immobilizing means 124 may take any other form known to the person skilled in the art. In the case of a chassis 500 for fixing the propulsion assembly 151 to the wing 24 the chassis 500 therefore includes a plurality of formers 502 and a plurality of beams 504 with the beams 504 fixed to the formers 502 by means of assemblies 100, 400 as described hereinabove, with each former 502 constituting a support plate 102 and each sleeve 110a-b receiving inside it one end of a beam 504.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for fixing beams comprising:
   a support plate through which an opening passes and having a first face and a second face opposite the first face, the first and second faces being parallel to a bearing plane,
   a first fixing including:
      a first base fixed against the first face by fixing means,
      on a side opposite the first face, at least one first sleeve configured to receive, inside the at least one first sleeve, one end of a beam, and
      a stud extending through said opening and including a hole with an axis,
   a second fixing including
      a second base bearing against the second face and,
      on a side opposite the second face, at least one second sleeve fastened to the second base and configured to receive, inside the at least one second sleeve, one end of a beam,
      a housing in which said stud is housed and which includes a clamping wall through which passes a hole facing said hole of said stud, and
   a clamping screw screwed into the hole of the stud and sandwiching the clamping wall, an axis of the hole being at an angle (α) to the bearing plane between 10° and 80° inclusive.

2. The assembly according to claim 1, wherein the hole is coaxial with a sleeve of the first fixing.

3. The assembly according to claim 1, wherein a head of the clamping screw is housed in a bushing of the second fixing, the bushing having a cylindrical surface which carries a first thread,
   wherein the assembly further comprises an additional beam with an end having a second thread complementary to the first thread.

4. The assembly according to claim 1, wherein the stud has an exterior surface that fits inside an interior surface of the housing, and
   wherein the exterior surface and the interior surface are parallel to an axis of the hole.

5. The assembly according to claim 1, wherein the stud has an exterior surface that fits inside an interior surface of the housing, and
   wherein the exterior surface and the interior surface are both perpendicular to the bearing plane.

6. The assembly according to claim 1, wherein the angle is between 30° and 60° inclusive.

7. A chassis for fixing a propulsion assembly to a wing of an aircraft, said chassis comprising:
   a plurality of formers,
   a plurality of beams,
   a plurality of the assembly of claim 1,
   wherein the beams are fixed to the formers by the assemblies, each former constituting a support plate and each sleeve receiving an end of the beams.

8. An aircraft comprising:
   the chassis according to claim 7,
   a propulsion assembly,
   and a wing, the propulsion assembly fixed to the chassis and the chassis fixed to the wing.

* * * * *